H. C. GLASGOW.
Railway Car.

No. 34,829.

Patented Apr. 1, 1862.

Witnesses:
Wm E Mans
John Tracy

Inventor:
Henry C Glasgow

UNITED STATES PATENT OFFICE.

HENRY C. GLASGOW, OF CHICAGO, ILLINOIS.

IMPROVEMENT IN BRAKEMEN'S CABS.

Specification forming part of Letters Patent No. 34,829, dated April 1, 1862.

*To all whom it may concern:*

Be it known that I, HENRY C. GLASGOW, of Chicago, in the county of Cook and State of Illinois, have invented a new and useful Cab for Protecting Brakemen from the Wind and Storm; and I do hereby declare that the following is a full and exact description thereof, reference being had to the accompanying drawings and letters of reference marked thereon.

The nature of my invention consists in constructing a cab in such a manner that it can be folded together into a form convenient for carrying in the hand, or be set up in the form of a cab and fastened to the race-board on the top of freight-cars in a suitable manner for a person to sit in and be protected from the storm.

To enable others skilled in the art to make and use my invention, I will proceed to describe its construction and operation.

Figure 2:
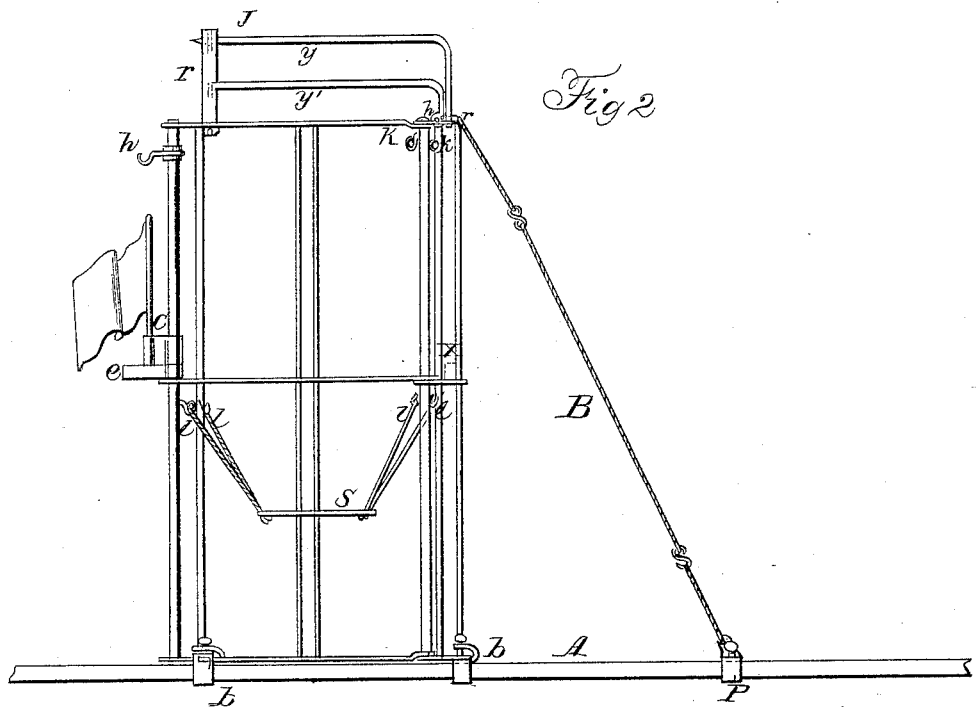
Figure 1:
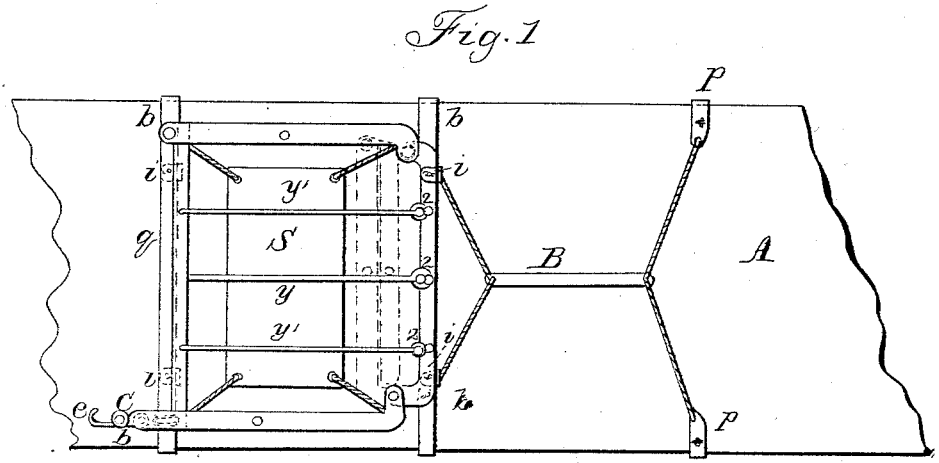

Figure 1 is a plan view of my invention, and Fig. 2 a side elevation.

A A represent the race-board to which the cab is fastened by means of the clasps $b\ b$. These clasps grasp the edge of the board and are fastened to the bottom of the cab by means of the thumb-screws $i$.

B is a brace bracing the cab from the top and is fastened to the race-board by means of the clasps $p$.

$y\ y'$ are top pieces or ribs, and are hung with joints at $z$, the other ends passing through the rafters $r$.

$c$ is a socket for the flag-staff when the flag is in use, and $x$ is a place for storing it away.

$h$ is a hook for a lantern, and $e$ a clasp for holding the cab together when folded up.

$s$ is a seat suspended at each corner from the hooks $l$ in such a manner that it can be raised or lowered to suit convenience.

The cab is loosened from the race-track by turning the thumb-screws $i$, and folded for transportation by drawing back the rib $y$, which opens the joint $j$ and allows the rafters $r$ to swing down to the sides and the ribs $y\ y'$ to swing to the back; then the bottom piece $g$, which has a hinge at one end, is swung up to one side and the two front chains are taken from the hooks $l\ l$ and hitched to the hooks $k\ k$, thus allowing the two sides to be swung in, one over the other, against the back, as shown by the red lines in Fig. 1. Three sides and the top of the cab are to be covered with some suitable material for warding off the storm.

I claim as my invention—

The brakeman's cab when constructed substantially in the manner and for the purposes set forth.

HENRY C. GLASGOW.

Witnesses:
ROLLIN B. GRAY,
W. E. MAUS.